(12) United States Patent
Bronstein

(10) Patent No.: US 7,409,206 B2
(45) Date of Patent: Aug. 5, 2008

(54) DEFENDING AGAINST UNWANTED COMMUNICATIONS BY STRIKING BACK AGAINST THE BENEFICIARIES OF THE UNWANTED COMMUNICATIONS

(75) Inventor: Alexandre Bronstein, Palo Alto, CA (US)

(73) Assignee: ASTAV, inc, Pacifica, CA (US)

( * ) Notice: Subject to any disclaimer, the term of this patent is extended or adjusted under 35 U.S.C. 154(b) by 757 days.

(21) Appl. No.: 10/603,534

(22) Filed: Jun. 25, 2003

(65) Prior Publication Data

US 2004/0266413 A1 Dec. 30, 2004

(51) Int. Cl.
*H04M 3/42* (2006.01)
(52) U.S. Cl. .................... 455/415; 455/414.1; 455/575; 709/207
(58) Field of Classification Search ................. 455/405, 455/406, 408, 410, 411; 709/217–219; 209/207
See application file for complete search history.

(56) References Cited

U.S. PATENT DOCUMENTS

| | | | |
|---|---|---|---|
| 6,259,779 B1 * | 7/2001 | Council et al. ......... | 379/121.01 |
| 6,353,663 B1 * | 3/2002 | Stevens et al. ......... | 379/114.22 |
| 6,535,592 B1 * | 3/2003 | Snelgrove ............... | 379/114.07 |
| 6,650,742 B1 * | 11/2003 | Elliott et al. ........... | 379/114.22 |
| 6,782,084 B2 * | 8/2004 | Kondo et al. ................. | 379/126 |
| 2001/0016507 A1 * | 8/2001 | Karusawa .................... | 455/575 |
| 2002/0004800 A1 * | 1/2002 | Kikuta et al. ............... | 707/500 |
| 2002/0128033 A1 * | 9/2002 | Burgess ...................... | 455/528 |
| 2003/0195937 A1 * | 10/2003 | Kircher et al. .............. | 709/207 |
| 2005/0021649 A1 * | 1/2005 | Goodman et al. ........... | 709/207 |

OTHER PUBLICATIONS

Jaffe, New Plan for Spammers: Charge 'Em, Wired News, Dec. 10, 2002.

Fahlman, Selling Interrupt Rights: A Way to Control Unwanted e-mail and Telephone Calls, IBM Systems Journal, vol. 41, No. 4, 2002, pp. 759-766.

* cited by examiner

*Primary Examiner*—David Q. Nguyen

(57) ABSTRACT

Techniques for defense against unwanted communications by striking back against the beneficiaries of the unwanted communications include identifying a communication channel to a beneficiary of an unwanted communication and sending a communication via the communication channel to the beneficiary such that the communication imposes a cost to the beneficiary. The cost to the beneficiary may be used to deter further unwanted communication from the beneficiary.

18 Claims, 4 Drawing Sheets

DEFENDING AGAINST UNWANTED COMMUNICATIONS BY STRIKING BACK AGAINST THE BENEFICIARIES OF THE UNWANTED COMMUNICATIONS

BACKGROUND

Individuals and organizations may be subjected to the receipt of large amounts of unwanted communication. Examples of unwanted communication include email messages commonly referred to as spam, and telemarketer phone calls and fax calls, etc. Unwanted communication may impose a variety of costs on individuals and organizations. Examples of the costs of unwanted communication include loss of time, productivity, consumption of communication resources, user frustration, etc.

Prior techniques for defending against unwanted communications usually involve message blocking. For example, email programs may include spam filters that deflect, flag, delete, etc., spam email messages. Similarly, telephone systems may be provided with caller ID mechanisms for blocking unwanted phone and fax calls. Likewise, internet service providers may attempt to block transmission channels from known senders of spam email.

Unfortunately, message blocking may fail to stop or even deter the large-scale transmission of unwanted communications. For example, the senders of spam email continue to develop schemes for defeating spam filters and for overcoming attempts to block their transmission channels. In addition, the senders of spam email may be located in jurisdictions that are outside the reach of any legal constraints on spam.

SUMMARY OF THE INVENTION

Techniques are disclosed for defense against unwanted communications by striking back against the beneficiaries of the unwanted communications. The present techniques include identifying a communication channel to a beneficiary of an unwanted communication and sending a communication via the communication channel such that the communication imposes a cost to the beneficiary. The cost to the beneficiary may be used to deter further unwanted communication from the beneficiary. The present techniques may be used to marshal a distributed strike back force against an identified beneficiary of unwanted communication. The distributed strike back force may include recipients, i.e. victims, of the unwanted communications so that the overall cost to the beneficiary of unwanted communications is proportional to the amount of unwanted communication engaged in by the beneficiary.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
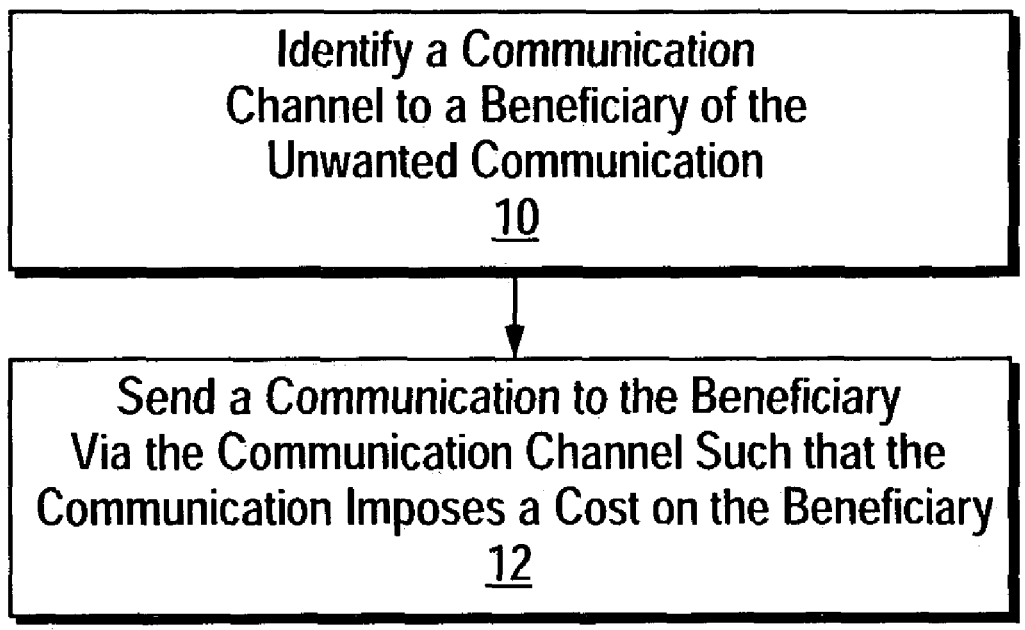
FIG. 1 shows a method for defense against an unwanted communication according to the present techniques.

FIG. 1 shows a method for defense against an unwanted communication according to the present techniques. The unwanted communication may be a spam email message, a telemarketer or other type of unsolicited phone or fax call, or a junk mailing, etc. A recipient of the unwanted communication may be an individual or an organization.

At step 10, a financially important communication channel to the beneficiary of the unwanted communication is identified. The beneficiary of the unwanted communication may be an individual and/or organization that seeks an economic or other benefit to flow from the unwanted communication. The beneficiary of an unwanted communication may or may not be a sender of the unwanted communication. A financially important communication channel to the beneficiary of the unwanted communication may be a communication channel that is used by the beneficiary to obtain a benefit from transmission of the unwanted communication. Examples of a financially important communication channel to the beneficiary of an unwanted communication include an email address, a web site, a phone or fax number, etc. associated with the beneficiary of the unwanted communication.

Step 10 may include examining the content of the unwanted communication and extracting an email address, a web site address, or phone or fax number. For example, an unwanted communication may specify a web address, phone number, etc., for use by a recipient of the unwanted communication in obtaining information pertaining a product or service offered in the unwanted communication. Similarly, an unwanted communication may specify a web address, phone number, fax number, etc., for use by a recipient of the unwanted communication when purchasing a product or service. A web address in an unwanted communication may point to an order form or other form that when filled out by a recipient provides a benefit to the beneficiary of the unwanted communication.

Step 10 may include tracking down a communication channel by responding to the unwanted communication in a manner suggested by the content of the unwanted communication. For example, a phone number specified in an unwanted communication may be called to obtain information that identifies the beneficiary of the unwanted communication. Similarly, a web address specified in an unwanted communication may be accessed to obtain an identification of the beneficiary and a communication channel that the beneficiary uses to obtain a benefit from the unwanted communication.

Similarly, a junk postal mailing may include phone numbers and/or a web addresses that may provide directly or indirectly an identification of a communication channel to a beneficiary of the junk mail.

At step 12, a communication is sent via the communication channel identified at step 10 such that the communication imposes a cost to the beneficiary. For example, a phone number obtained at step 10 may be called at step 12 and a voice message may be delivered that consumes some of the available capacity of a voice line to the beneficiary that might otherwise be used to obtain a purchase order. Similarly, a fax number obtained at step 10 may be called at step 12 and a fax may be sent that consumes some of the available capacity of a fax line to the beneficiary that might otherwise be used to receive a purchase order. Likewise, a web site address for an order form obtained at step 10 may be accessed using a web browser and a message may be entered into the form so as to consume some of the available web resources of the beneficiary, e.g. communication bandwidth, server resources, etc., that might otherwise be used by the beneficiary to receive an order for goods or services or to receive some other benefit.

The communication made at step 12 may inform the beneficiary that the recipient of the unwanted communication does not want to receive further communications from the beneficiary or from a sender that acts on behalf of the beneficiary. The communication made at step 12 may specify a phone number, a fax number, or email address, as appropriate to the nature of the unwanted communication along with a request that the specified phone number, fax number, or email address be removed from the beneficiary's phone book, address book, mailing list, etc., or from a list used by a sender, e.g. spammer, that acts on behalf to the beneficiary.

Step 12 may be performed repeatedly to inflict repeated costs to the beneficiary for the unwanted communication. It is preferable that the repetitions of step 12 be performed automatically using, for example, computer resources rather than human resources.

A communication to a beneficiary of an unwanted communication at step 12 may cause a small economic loss to the beneficiary through the consumption of resources that might otherwise be used to make money. The aggregate cost to the beneficiary of sending multiple unwanted communications is proportional to the number of recipients of the unwanted communications that respond to receipt of an unwanted communication in accordance with steps 10-12. For example, the greater the scale of operations of a sender of spam, the greater the economic loss that may be inflicted on the beneficiary of the spam by recipients of the spam that apply the present defensive techniques.

Step 10 may include the identification of more than one communication channel to the beneficiary. For example, a toll-free voice number, a fax number, and web address may be identified at step 10. Only one communication channel to the beneficiary is needed for a strike back at step 12. Nevertheless, additional communication channels may be used to enhance the flexibility of the strike back at step 12.

Step 10 may include performing a pattern search through the text of an unwanted communication, decryption of standard base 64 encoded text, or in some cases human visualization of an unwanted communication. In some cases, detective-like calling and/or following URL links, exploring web sites, etc. may be needed until a communication channel that is financially important to the beneficiary is found. For example, a web site specified in an unwanted communication may be explored until a registration page or order page, etc. is found. It is preferable that automated techniques be employed whenever possible.

Figure 2:
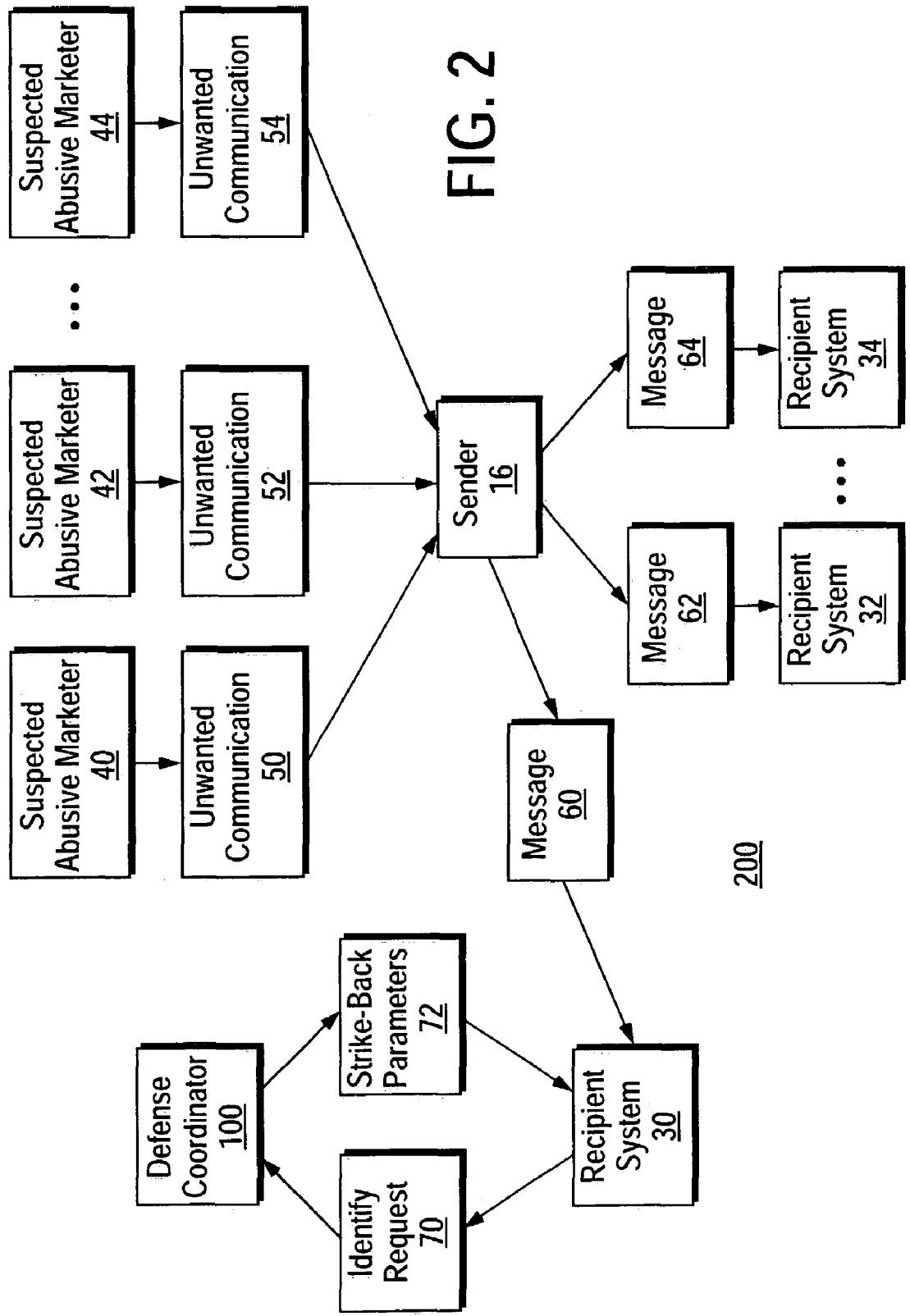
FIG. 2 shows a communication protection system according to the present teachings.

FIG. 2 shows a communication protection system 200 according to the present teachings. The communication protection system 200 includes a defense coordinator 100 that enables a set of recipient systems 30-34 to engage in a defense against a set of unwanted communications 50-54 by striking back against the beneficiaries of the unwanted communications 50-54, thereby deterring further unwanted communication from the beneficiaries. The beneficiaries are a set of suspected abusive marketers 40-44. The recipient systems 30-34 may include any device capable of receiving unwanted communications, e.g. end-user computers, email firewalls of organizations, phone or fax systems, hand-held devices, appliances with web/email functionality, etc.

The suspected abusive marketers 40-44 may employ a sender 16 to forward the unwanted communications 50-54 to the recipient systems 30-34 in a set of messages 60-64. For example, the suspected abusive marketers 40-44 may provide the sender 16, a spam service, with the content of the unwanted communications 50-54 and the sender 16 may construct and send the messages 60-64 that include the content of the unwanted communications 50-54 as spam email messages. Similarly, the suspected abusive marketers 40-44 may provide the sender 16, a telemarketing service, with the content of the unwanted communications 50-54 and the sender 16 may generate and transmit the messages 60-64 as telemarketer phone or fax calls that include the content of the unwanted communications 50-54. Alternatively, the suspected abusive marketers 40-44 may send the unwanted communications 50-54 to the recipient systems 30-34.

The defense coordinator 100 provides an identify service for identifying the financially important communication channels to the beneficiaries of the unwanted communications 50-54 in accordance with step 10. A financially important communication channel to the beneficiary of an unwanted communication may be referred to as a money input channel (MIC). In one embodiment, the recipient systems 30-34 use the identify service of the defense coordinator 100 to obtain a set of strike back parameters that enable defensive strikes against the suspected abusive marketers 40-44.

For example, the recipient system 30 forwards the content of the message 60 to the defense coordinator 100 in an identify request 70. The defense coordinator 100 examines the content of the message 60 and determines an MIC for the beneficiary of the message. For example, the defense coordinator 100 may perform a text search on the content of the message 60 looking for toll-free numbers-or may search for a URL to an https (i.e. secure) web address, or track down URLs in the html content of the message 60. The defense coordinator 100 then generates a set of strike back parameters 72 that enable a strike back against the identified beneficiary, i.e., one of the suspected abusive marketers 40-44, of the message 60. In one embodiment, the strike back parameters include an MIC, a frequency f, and a total count c.

For example, the strike back parameters 72 may be as follows.

MIC="800-123-4567"

$f = 1/\text{day}$ $c = 7$

In one embodiment, the defense coordinator 100 sends the strike back parameters 72 to the recipient system 30 and the recipient system 30 performs the strike back. The recipient system 30 strikes back using the example strike back parameters 72 shown above by calling 800-123-4567 (the identified MIC for the message 60) and delivering a strike back message to that number once per day for a total of 7 calls.

Alternatively, the defense coordinator 100 may use the strike back parameters 72 to perform a centralized strike back. The defense coordinator 100 strikes back using the example strike back parameters 72 shown above by calling 800-123-4567 and delivering a strike back message once per day for a total of 7 calls.

A strike back message should consume a significant portion of bandwidth on the MIC. Examples include a one to two minute phone call or a one to two page fax or a postcard or letter, etc. The message should be generated using computer-based methods, e.g. speech synthesis, web script, etc., so that the victim of an unwanted communication does not waste time.

The intensity of a strike back may increase as more and more unwanted communication is received from the same suspected abusive marketer. The intensity of a strike back, and the consequential cost to a beneficiary, may be adjusted by adjusting the strike back parameters f and c. For example, the intensity may be increased by increasing f and/or c.

The recipient systems 30-34 may together provide a distributed strike back force against the suspected abusive marketers 40-44. The recipient systems 30-34 forward unwanted communications to the defense coordinator 100 and receive back strike back parameters for a coordinated counter-attack against the suspected abusive marketers 40-44.

A distributed strike back force may be advantageous in the case of spam email because the amount of spam is enormous and a centralized strike back may have to employ an extremely large scale computer and telephone infrastructure. In addition, sophisticated spammers may identify the source addresses, e.g. IP addresses or phone numbers, of a centralized strike back force and attempt to block incoming connections from those source address. A distributed strike back force may overcome such blocking. Moreover, any blocking by spammers would also block their potential target recipients.

On the other hand, a centralized strike back force may be used to off load the task of striking back from the clients of the defense coordinator 100.

The strike back parameters f and c enable a strike back to be modulated based on a variety of factors. These factors may include legal constraints, economic constraints, the number of expected recipients of an unwanted communication, the number of recipients engaged in strike backs, and the odiousness of a suspected abusive marketer.

The recipient systems 30-34 may interact with the defense coordinator 100 using web protocols. For example, the recipient systems 30-34 may function as web clients to the defense coordinator 100 which is a web server. Alternatively, the recipient systems 30-34 may interact with the defense coordinator 100 using email, voice, or fax calls.

A strike back defense using the present techniques may be used in a complementary fashion with any existing spam filtering/detection that may be implemented in the recipient systems 30-34.

If the messages 60-64 are telemarketer phone or fax calls to the recipient systems 30-34 which are associated with individual recipients, then the individual recipients may provide identify requests to the defense coordinator 100 using telephone calls, emails, faxes, voice mail, etc. Individual recipients may provide the pertinent content of the unwanted communication along with any other relevant information that may help identify the beneficiary.

Figure 3:
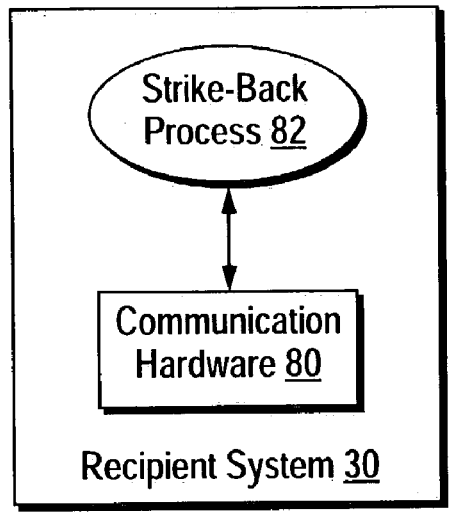
FIG. 3 shows an example embodiment of a recipient system.

FIG. 3 shows an example embodiment of a recipient system—in this case the recipient system 30. The recipient system 30 includes communication hardware 80 that enables transmission of a strike back message in accordance with the strike back parameters 72. For example, the communication hardware 80 may be a phone/fax line or a more sophisticated network communication interface, a wireless channel, etc. The communication hardware 80 may be a multi-line telemarketing device that enables strike backs for an entire organization.

The recipient system 30 includes processing resources that enables execution of a strike back process 82. The strike back process 82 sends the identify request 70 to the defense coordinator 100, obtains the strike back parameters 72 from the defense coordinator 100 and uses the communication hardware 80 to perform strike backs.

The message 60 may be detected by a spam email detector/filter that is part of the email program/service of the recipient system 30 which automatically triggers the identify request 70 to the defense coordinator 100. Alternatively, the identify request 70 to the defense coordinator 100 may be triggered manually by a user of the recipient system 30, e.g. by forwarding the unwanted communication to the defense coordinator in an email.

Figure 4:
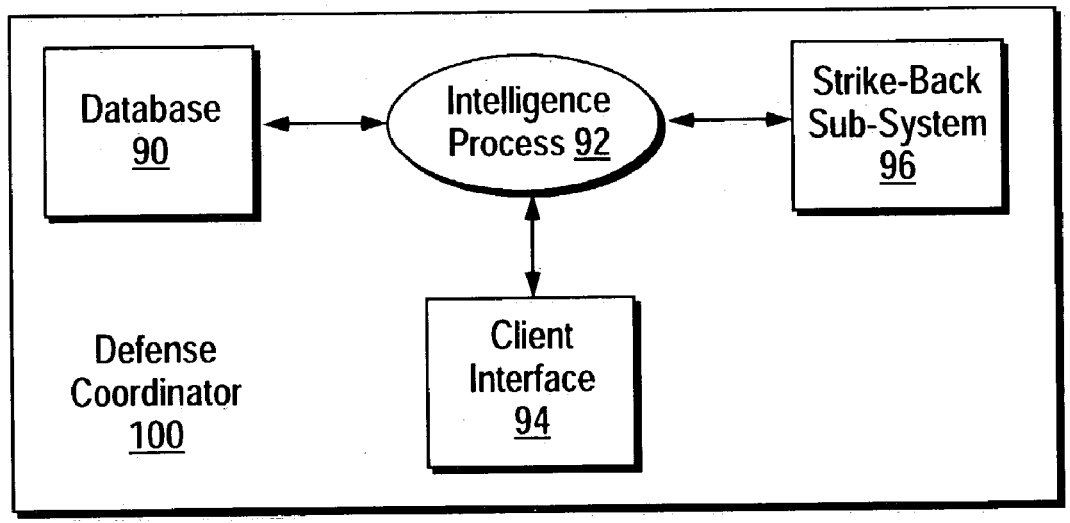
FIG. 4 shows an example embodiment of a defense coordinator.

FIG. 4 shows an example embodiment of the defense coordinator 100. The defense coordinator 100 includes a database 90, an intelligence process 92, a client interface 94, and a strike back subsystem 96.

The database 90 provides a mapping between the suspected abusive marketers 40-44 and their corresponding MICs. Each suspected abusive marketers 40-44 may have a corresponding record in the database 90 that stores one or more MICs. The central defense coordinator 100 may associate an identifier (SAMid) to each suspected abusive marketer listed in the database 90. A SAMid may be derived from the corresponding unwanted communication.

The intelligence process 92 obtains identify requests from the recipient systems 30-34 via the client interface 94. The intelligence process 92 identifies MICs in response to identify requests and logs MICs in the database 90. The intelligence process 92 generates strike back parameters and sends the strike back parameters to the recipient systems 30-34 via the client interface 94 or to the strike back subsystem 96 for direct strike back by the defense coordinator 100. The client interface 94 includes communication hardware/software for communicating with the recipient systems 30-34. The strike back subsystem 96 include communication hardware/software for communicating stick back messages to the suspected abusive marketers 40-44.

The strike back subsystem 96 includes elements for performing strike back in accordance with step 12 above. For example, the strike back subsystem 96 may include hardware/software for accessing web sites, calling phone numbers, etc. For example, the strike back subsystem 96 may send https requests to MIC web addresses and enter messages into order forms. Similarly, the strike back subsystem 96 may transmit phone calls/faxes to identified MICs.

The defense coordinator 100 may assign validation parameters to each suspected abusive marketer listed in the database 90 to reduce the likelihood of strike backs against innocent parties. In one embodiment, the validation parameters include a Boolean target_validated parameter and a Boolean target_presumed_valid parameter. The target_validated parameter may be used to indicate whether or not a human has verified that the corresponding suspected abusive marketer is a valid target of a strike back. The target_presumed_valid parameter is an automatic indication of whether or not the corresponding suspected abusive marketer is a valid target of a strike back. The automatic determination may be based on a variety of criteria such as whether the corresponding suspected abusive marketer sent emails or repeated phone calls, whether the corresponding MIC is a toll-free number, or a regular phone number, or a URL etc. The defense coordinator 100 may decline to issue strike back parameters to a requesting recipient system if the target_validated or target_presumed_valid parameter is false.

The defense coordinator 100 may maintain a list of "innocent" suspected abusive marketers and corresponding MICs to prevent strikes against innocent parties. Attempts by a recipient to cause a strike back against an innocent party using a false report of an unwanted communication may cause the defense coordinator 100 to drop that recipient as a client.

Figure 5:
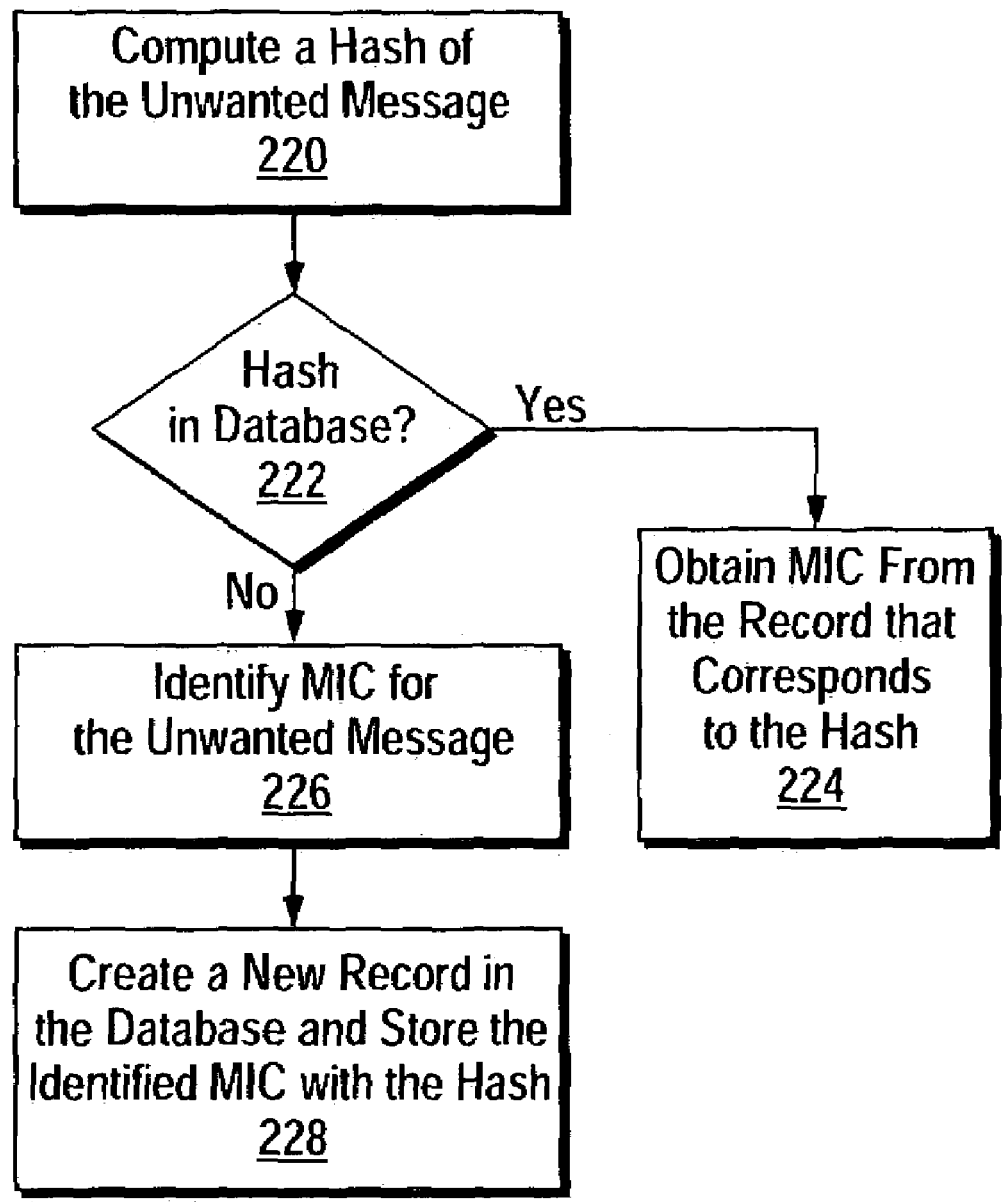
FIG. 5 shows the handling of an identify request by the intelligence process in the defense coordinator in one embodiment.

FIG. 5 shows the handling of an identify request by the intelligence process 92 in the defense coordinator 100. At step 220, the intelligence process 92 computes a hash of the unwanted communication carried in the identify request. At step 222, the intelligence process 92 determines whether a record in the database 90 includes the hash from step 220. If a record is found at step 222, then at step 224 the intelligence process 92 reads that record and uses the MICs specified in that record in constructing a set of strike back parameters.

If a record with the hash from step 220 is not found at step 222, then at step 226 the intelligence process 92 identifies one or more MICs from the unwanted communication in accordance with step 10 above. At step 228, the intelligence process 92 creates a new record in the database 90, and writes the hash from step 220 into the new record along with the identified MICs from step 226. The intelligence process 92 then uses the identified MICs from step 226 to construct a set of strike back parameters for responding to the unwanted communication carried in the identify request. The new record with the hash of the unwanted communication enables a fast retrieval from the database 90 of the MICs if the same unwanted communication is received in a subsequent identify request.

In alternative to a hash, the intelligence process 92 may identify MICs in the database 90 using identifying marks obtained from unwanted messages. For example, a record in the database 90 may store portions of text strings contained in an unwanted message along with the MICs for the corresponding beneficiary. Text pattern matching may then be used to match a subsequent unwanted message to existing records in the database 90.

The records in the database 90 may include additional information that may be used by the intelligence process 92 in determining the strike back parameters f and c. These factors may include the number of recipients of the corresponding unwanted communication, the number of recipients engaged in strike backs, and the odiousness of the beneficiary. These factors may be used by the intelligence process 92 to adjust the strike back parameters f and c and therefore the intensity of strike backs against the beneficiary. The strike back parameters f and c may be selected so that the aggregate of strike backs against a suspected abusive marketer is proportional to the magnitude of the overall unwanted communication from that suspected abusive marketer, thereby providing enough economic motivation for the suspected abusive marketer to change their behavior.

A strike back may include a request for a suspected abusive marketer to perform a manual operation in order to prevent further strike backs. An example of a manual operation is filling out a form in a web site generated by the defense coordinator 100 that confirms that a recipient's email address, phone number, etc. has been removed from the suspected abusive marketers contacts list. The form may be constructed to require a human input rather than automated form filling. Another example of a manual operation is providing a credit card or other payment input in a form generated by the defense coordinator 100. This increases the cost to the suspected abusive marketer of sending unwanted communications and may provide some compensation or comfort to their victims.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for defense against an unwanted communication, comprising:

identifying a communication channel to a beneficiary of the unwanted communication by examining a content of the unwanted communication wherein the beneficiary is not a sender of the unwanted communication;

maintaining a set of information pertaining to the beneficiary and determining a set of strike back parameters in response to the information;

striking back repeatedly against the beneficiary by sending a communication via the communication channel to the beneficiary in accordance with the strike back parameters.

2. The method of claim 1, wherein sending a communication via the communication channel to the beneficiary comprises sending a communication via the communication channel that includes a request that the beneficiary cease further unwanted communications to a recipient of the unwanted communication.

3. The method of claim 1, further comprising:

adjusting a cost imposed on the beneficiary with the communication by adjusting the strike back parameters.

4. The method of claim 1, wherein identifying comprises identifying a money input channel used by the beneficiary to obtain a benefit.

5. The method of claim 1, wherein identifying comprises calling a phone number contained in the unwanted communication.

6. The method of claim 1, wherein identifying comprises accessing a web site specified in the unwanted communication.

7. The method of claim 6, wherein identifying comprises the exploring a web site specified in the unwanted communication to find a web page that is financially important to the beneficiary.

8. The method of claim 1, wherein identifying comprises performing a pattern match on a text of the unwanted communication.

9. A defense coordinator that obtains an identify request from a recipient of an unwanted communication and that in response identifies a communication channel to a beneficiary of the unwanted communication by examining a content of the unwanted communication wherein the beneficiary is not a sender of the unwanted communication and that performs a strike back against the beneficiary by sending a communication via the communication channel to the beneficiary wherein the defense coordinator maintains a set of information pertaining to the beneficiary and determines a set of strike back parameters in response to the information and repeatedly performs the strike back in accordance with the strike back parameters.

10. The defense coordinator of claim 9, wherein the communication includes a request that the beneficiary cease further unwanted communications to the recipient.

11. The defense coordinator of claim 9, wherein the communication channel is a money input channel used by the beneficiary to obtain a benefit.

12. The defense coordinator of claim 9, wherein the defense coordinator generates a web page that enables the beneficiary to stop the strike back.

13. A distributed strike back system, comprising:

recipient system of an unwanted communication;

defense coordinator that obtains an identify request from the recipient system and that in response determines a set of strike back parameters that identify a communication channel to a beneficiary of the unwanted communication by examining a content of the unwanted communication wherein the beneficiary is not a sender of the unwanted communication and that sends the strike back parameters to the recipient system such that the recipient system performs a strike back against the beneficiary by sending a communication via the communication channel to the beneficiary wherein the defense coordinator maintains a set of information pertaining to the beneficiary and determines the strike back parameters in response to the information and the recipient system repeatedly performs the strike back in accordance with the strike back parameters.

14. The distributed strike back system of claim 13, wherein the communication includes a request that the beneficiary cease further unwanted communications to the recipient system.

15. The distributed strike back system of claim 13, wherein the communication channel is a money input channel used by the beneficiary to obtain a benefit.

16. The distributed strike back system of claim 13, wherein the defense coordinator maintains a set of information pertaining to the beneficiary and determines the strike back parameters in response to the information such that the strike back parameters specify an intensity of the strike back against the beneficiary.

17. The distributed strike back system of claim 13, wherein the defense coordinator generates a web page that enables the beneficiary to stop the strike back.

18. The distributed strike back system of claim 13, wherein defense coordinator identifies the communication channel by performing a pattern match on a text of the unwanted communication.

* * * * *